Nov. 20, 1945. W. H. HUNTER 2,389,313
SHIELD ASSEMBLY FOR AIR SCOOPS OR THE LIKE
Filed Sept. 11, 1943
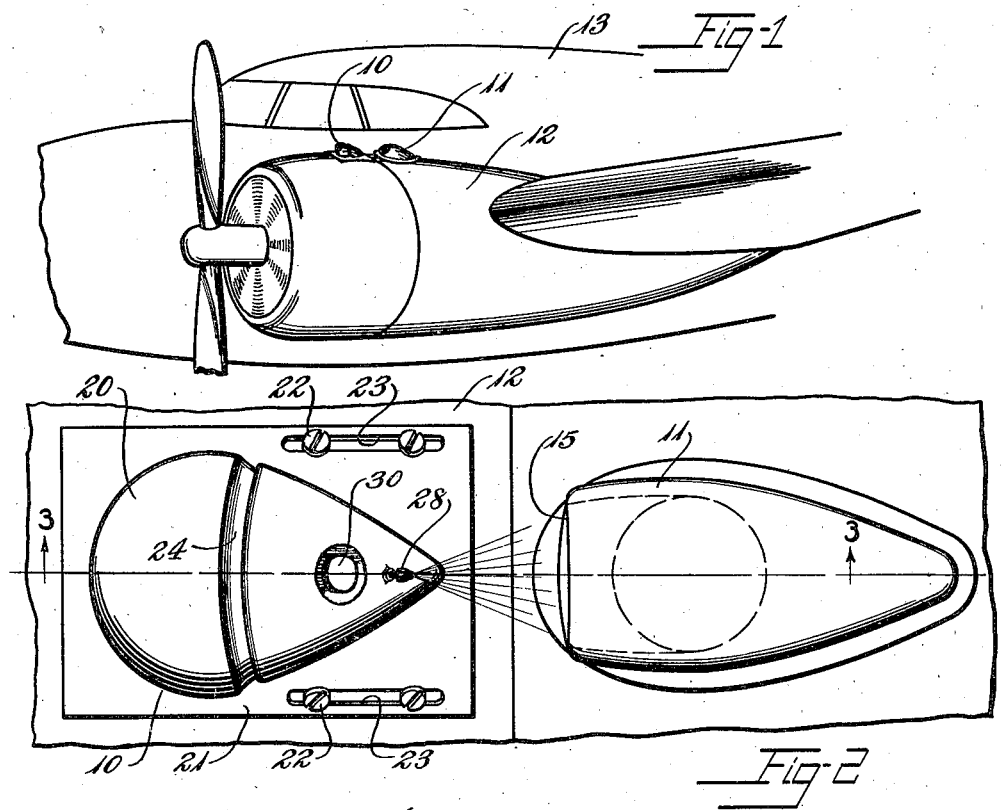
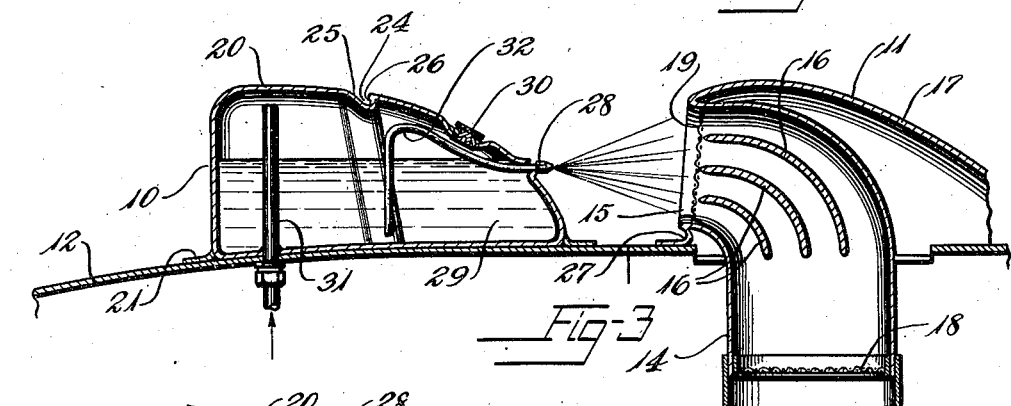
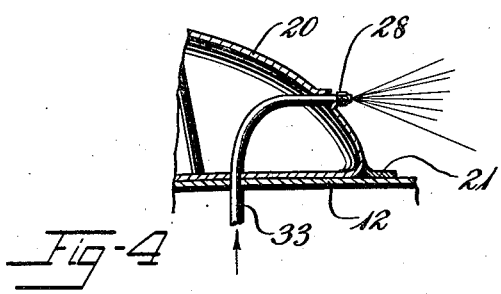
Inventor
Willson H. Hunter
By Willis F. Avery
Atty Patented Nov. 20, 1945

2,389,313

UNITED STATES PATENT OFFICE 2,389,313

SHIELD ASSEMBLY FOR AIR SCOOPS OR THE LIKE

Willson H. Hunter, Akron, Ohio, assignor to The B. F. Goodrich Company, New York, N. Y., a corporation of New York Application September 11, 1943, Serial No. 501,979

13 Claims. (Cl. 98—1)

This invention relates to means for protecting parts of aircraft and the like, to prevent the accumulation of ice, dirt, and other foreign matter thereon and is especially concerned with a shield assembly for preventing accumulation of ice on air scoops such as the carburetor air intake scoops of aircraft.

Ice accumulation on carburetor air intake scoops has long presented a serious problem in the operation of aircraft in icing weather conditions. Ice tends to accumulate about the mouth of the scoop and to bridge across the turning vanes usually provided in the scoop for providing smooth air flow to the carburetor with the result that the air supply to the carburetor is greatly diminished and in severe cases completely cut off. Other foreign matter such as raindrops, dirt, stones, leaves, and the like, also are carried into into the scoop by the air stream with objectionable consequences.

The present invention provides, with economy and efficiency, means for minimizing the collection of ice on the air scoop together with means for removing any small amount of ice which may, nevertheless, succeed in accumulating, while efficiency of the scoop in its function of taking in air is not objectionably impaired. Collection of ice is minimized by intercepting and deflecting ice and ice-forming water particles in advance of the scoop while removal of any ice which may accumulate is accomplished by introducing anti-icing fluid into the air stream in advance of the scoop. Particles of other foreign matter also are deflected from the scoop. The arrangement is such, however, that air is effectively conducted into the scoop.

The invention will be described in greater detail with reference to the accompanying drawing, of which Fig. 1 is a fragmentary perspective view of a conventional aircraft embodying the air scoop shield assembly of the invention.

Fig. 2 is a plan view showing the air scoop and shield assembly in somewhat greater detail.

Fig. 3 is a vertical section taken on line 3—3 of Fig. 2.

Fig. 4 is a similar sectional view illustrating a slightly modified embodiment of the invention.

In the preferred embodiment of the invention illustrated in the drawing, the shield assembly 10 of the invention is mounted in the air stream in advance of the carburetor air intake scoop 11 on the motor nacelle 12 of a conventional aircraft 13.

The carburetor air scoop 11 usually comprises a curved air intake tube 14 having a mouth 15, turning vanes 16, 16 for insuring smoothness of air flow to the carburetor, and a streamlined hood or cover 17. A screen 18 usually is provided in the scoop rearwardly of the turning vanes for filtering out foreign matter and, if desired, a second screen 19 may be placed at the mouth of the scoop in advance of the turning vanes, although the latter screen frequently will be omitted.

The scoop shield 10 preferably comprises a streamlined body 20 having a maximum width of the same order as the width of the air scoop mouth and preferably being slightly wider than the mouth so that the advancing air stream will be divided and deflected in advance of the scoop mouth and caused to flow around the streamlined body and thence into the mouth. Free flow of air to the scoop is, consequently, not impeded by the shield. Particles of foreign matter borne by the air stream do not, however, travel with the air into the mouth of the scoop but, because of their inertia, such particles tend to continue their travel outwardly and rearwardly from the streamlined shield without turning inwardly about its tapered rear portion as does the air stream. Thus, all but possibly minor quantities of foreign particles are caused to by-pass the mouth of the scoop. Also, a small portion of the foreign matter may be deposited on the nose of the body 20, thereby further protecting the scoop itself.

The body 20 conveniently may be welded or otherwise attached to a mounting flange 21 and secured to the motor nacelle by means of screws 22 extending through slots 23 in the flange, the slots and screws providing means for adjusting the spacing between the streamlined body 20 and the air scoop 11 for most effective operation.

For intercepting and deflecting water or other liquid flowing rearwardly over the surface of the streamlined body, a shallow trough 24 is provided, the trough being depressed below the streamlined surface of the body 20 and preferably extending across the entire exposed surface of the body in a central zone thereof. To insure that water will be intercepted and not permitted merely to flow across the trough, the trough preferably has a gently sloping forward face 25 while the rearward face 26 should be abrupt and preferably even reversely turned forwardly as shown more clearly in Fig. 3. Water intercepted by the trough is carried to and deposited on the skin surface of the motor nacelle where it flows rearwardly, a water deflecting groove 27 also being provided between the scoop mouth and the nacelle.

Notwithstanding the protective effect of the streamlined body, water vapor may under certain conditions enter the scoop and form ice. For preventing freezing of such water vapor or removing such ice, means are provided for introducing a suitable anti-icing liquid such as alcohol or glycerine into the air stream in advance of the scoop. Preferably, the anti-icing liquid is directed rearwardly from the streamlined body and introduced into the air stream at a position adjacent the rearmost portion of the body. Such introduction of the anti-icing liquids may be effected by means of a liquid spray-head 28 extending slightly from the surface of the body 20 at a point near the rear tip, the spray-head 28 preferably being disposed generally centrally with respect to the mouth 15 of the air scoop.

For maximum simplicity and economy, a supply of the anti-icing liquid may be carried within the streamlined body 20 itself, the liquid being indicated by the numeral 29. In such case, the body 20 preferably comprises a liquid-tight hollow shell of metal or other appropriate material provided with a conventional filling opening and closure cap as shown at 30. For effecting discharge of the anti-icing liquid, air or other fluid under pressure is admitted through the entrance conduit 31 to force the liquid out through the discharge conduit 32 leading to the spray-head 28. In a modified embodiment of the invention illustrated in Fig. 4, the anti-icing fluid may be supplied from a remote point by means of the discharge conduit 33 extending through the streamlined body 20 to the spray-head 28 as shown. In either case, discharge of the anti-icing fluid may be controlled at the will of the pilot by means of valves, not shown.

The invention achieves to a high degree the objects of minimizing collection of foreign material, particularly ice, about the air scoop mouth and of eliminating such ice as may form thereon, all with maximum simplicity, efficiency, and economy.

Although the invention has been described with particular reference to the protection of carburetor air scoops, it will be appreciated that the principles herein set out may be employed with equal satisfaction in numerous other instances involving analogous problems. Also, variations may be effected in the arrangement and structures described without departing from the spirit and scope of the invention as it is defined by the appended claims.

I claim:

1. A shield assembly for an air scoop or the like projecting from a surface of aircraft, said assembly comprising a body disposed on the surface in the air stream in advance of the mouth of the scoop to deflect air-borne foreign matter while permitting free flow of air to the scoop, means for intercepting and deflecting liquid flowing rearwardly along the body surface, and means within said body and extending through the rear wall thereof for introducing anti-icing fluid into the air stream rearwardly of the said body and in a rearward direction against the mouth of said scoop.

2. A shield assembly for an air scoop or the like comprising a body disposed in the air stream in advance of the mouth of the scoop to deflect air-borne foreign matter while permitting free flow of air to the scoop, the said body having a shallow trough depressed below the body surface and extending generally cross-wise of the body for intercepting and deflecting liquid flowing rearwardly along the body surface, and means for introducing anti-icing fluid into the air stream rearwardly of the said body.

3. A shield assembly for an air scoop or the like projecting from a surface of aircraft, said assembly comprising a body disposed on the surface in the air stream in advance of the mouth of the scoop to deflect air-borne foreign matter while permitting free flow of air to the scoop, a shallow trough depressed below the surface of said body for intercepting and deflecting liquid flowing rearwardly along the body surface, and means within said body and extending through the rear wall thereof for introducing anti-icing fluid into the air stream at a point rearward of the aforesaid liquid intercepting and deflecting means in a rearward direction against the mouth of said scoop.

4. A shield assembly for an air scoop or the like projecting from a surface of aircraft, said assembly comprising a body disposed on the surface in the air stream in advance of the mouth of the scoop to deflect air-borne foreign matter while permitting free flow of air to the scoop, means for intercepting and deflecting liquid flowing rearwardly along the body surface, and means partially within said body and extending rearwardly through the wall thereof for storing and introducing anti-icing fluid into the air stream at a position adjacent the rearmost portion of the streamlined body in a rearward direction about the mouth of said scoop.

5. A shield assembly for an air scoop or the like projecting from a surface of aircraft, said assembly comprising a body disposed on the surface in the air stream in advance of the mouth of the scoop to deflect air-borne foreign matter while permitting free flow of air to the scoop, the said body having a shallow trough depressed below the body surface and extending generally cross-wise of the body for intercepting and deflecting liquid flowing rearwardly along the body surface.

6. A shield assembly for an air scoop or the like comprising a streamlined body disposed in the air stream in advance of the mouth of the scoop to deflect air-borne foreign matter while permitting free flow of air to the scoop, the said body having a shallow trough depressed below the streamlined body surface for intercepting and deflecting liquid flowing rearwardly along the body surface, the said trough extending across substantially the entire exposed surface of the body in a generally central zone thereof.

7. A shield assembly for an air scoop or the like projecting from the surface of aircraft, said assembly comprising a body disposed on said surface in the air stream in advance of the mouth of the scoop to deflect air-borne foreign matter while permitting free flow of air to the scoop, and means within said body and extending therethrough for storing and introducing anti-icing fluid into the air stream rearwardly of the said body about the mouth of said scoop.

8. A shield assembly for an air scoop or the like projecting from a surface of aircraft, said assembly comprising a streamlined body disposed on the surface in the air stream in advance of the mouth of the scoop to deflect air-borne foreign matter while permitting free flow of air to the scoop, and means including storage means within said body and spray means extending rearwardly therefrom for introducing anti-icing fluid into the air stream at a position adjacent the rearmost portion of the streamlined body and in a rearward direction against the mouth of said scoop.

9. A shield assembly for an air scoop or the like projecting from the surface of aircraft, said assembly comprising a body disposed on the surface in advance of the mouth of the scoop to deflect air-borne foreign matter while permitting free flow of air to the scoop, and means for introducing anti-icing fluid into the air stream adjacent the said body, the said body containing a supply of the anti-icing fluid.

10. A shield assembly for an air scoop or the like projecting from the surface of aircraft, said assembly comprising a streamlined body disposed on the surface in advance of the mouth of the scoop to deflect air-borne foreign matter while permitting free flow of air to the scoop, the said body comprising a liquid-tight hollow shell adapted to contain anti-icing fluid, and means for discharging the anti-icing fluid from the shell into the air stream adjacent the body.

11. A shield assembly for an air scoop or the like projecting from the surface of aircraft, said assembly comprising a streamlined body disposed on the surface in advance of the mouth of the scoop to deflect air-borne foreign matter while permitting free flow of air to the scoop, the said body comprising a liquid-tight hollow shell and means for discharging the anti-icing fluid from the shell rearwardly into the air stream adjacent a rearmost portion of the body.

12. A shield assembly for an air scoop or the like comprising a streamlined body disposed in advance of the mouth of the scoop to deflect air-borne foreign matter while permitting free flow of air to the scoop, the said body comprising a liquid-tight hollow shell of streamlined configuration adapted to contain anti-icing fluid, the shell wall in a central zone being formed to provide a trough depressed below the streamlined surface for intercepting and deflecting liquid flowing rearwardly along the streamlined surface, and means comprising a conduit extending through the shell wall for discharging the anti-icing fluid from the shell into the air stream adjacent the body.

13. A shield assembly for an air scoop or the like projecting from the surface of aircraft, said assembly comprising a hollow body disposed on the surface in advance of the mouth of the scoop, and means including storage means and spray means for conducting antifreeze liquid from within said body to a position outside the same for discharging said liquid into the air flowing past said body and into said mouth, said fluid conducting means comprising means for directing a spray of fluid against the mouth of said scoop.

WILLSON H. HUNTER.